US009027887B2

(12) United States Patent
Polle (10) Patent No.: US 9,027,887 B2
(45) Date of Patent: May 12, 2015

(54) METHOD OF CONTROLLING THE ATTITUDE OF A SATELLITE AND AN ATTITUDE-CONTROLLED SATELLITE (71) Applicant: Astrium Sas, Suresnes (FR)

(72) Inventor: Bernard Polle, Saint-Orens (FR)

(73) Assignee: Airbus Defence and Space SAS, Les Mureaux (FR)

( * ) Notice: Subject to any disclaimer, the term of this patent is extended or adjusted under 35 U.S.C. 154(b) by 0 days.

(21) Appl. No.: 14/345,515

(22) PCT Filed: Sep. 19, 2012

(86) PCT No.: PCT/EP2012/068454
§ 371 (c)(1),
(2) Date: Apr. 15, 2014

(87) PCT Pub. No.: WO2013/041575
PCT Pub. Date: Mar. 28, 2013

(65) Prior Publication Data
US 2015/0001345 A1   Jan. 1, 2015

(30) Foreign Application Priority Data

Sep. 19, 2011   (FR) .................................... 11 02835

(51) Int. Cl.
*B64G 1/10*   (2006.01)
*B64G 1/28*   (2006.01)
(Continued)

(52) U.S. Cl.
CPC .. *B64G 1/28* (2013.01); *B64G 1/26* (2013.01); *B64G 1/283* (2013.01); *B64G 1/407* (2013.01); *B64G 1/242* (2013.01); *B64G 1/443* (2013.01); *B64G 2001/245* (2013.01)

(58) Field of Classification Search
USPC ............................................... 244/158.6, 168
See application file for complete search history.

(56) References Cited

U.S. PATENT DOCUMENTS 4,767,084 A * 8/1988 Chan et al. .................... 244/164
5,020,746 A * 6/1991 Anzel ........................... 244/169
(Continued)

FOREIGN PATENT DOCUMENTS

EP   0794120 A1   9/1997
EP   0937644 A2   8/1999
(Continued)

OTHER PUBLICATIONS

Randolph et al., "Three-Axis Electric Propulsion Attitude Control System with a Dual-Axis Gimbaled Thruster", 47th AIAA/ASME/SAE/ASEE Joint Propulsion Conference & Exhibit, Jul. 31-Aug. 3, 2011, San Diego, California.

(Continued)

*Primary Examiner* — Christopher P Ellis
*Assistant Examiner* — Medhat Badawi
(74) *Attorney, Agent, or Firm* — Im IP Law PLLC; C. Andrew Im (57) ABSTRACT A method of controlling the attitude of a satellite in orbit around a celestial body. The attitude of the satellite being controlled by a momentum storage device and controllable surfaces of the satellite configured to create desaturation torques in the storage device by using solar pressure. The controllable surfaces are arranged on solar panels mobile in rotation around an axis Y. At least one electric thruster configured to control the orbit of the satellite also controls the attitude of the satellite. The orientation of the electric thruster is controlled to activate the electric thruster with a thrust direction deliberately not aligned with a center of mass of the satellite to create desaturation torques in the storage device along axis Y. The controllable surfaces are controlled to create desaturation torques of the storage device in a plane orthogonal to the Y axis.

16 Claims, 4 Drawing Sheets (51) Int. Cl.
*B64G 1/26* (2006.01)
*B64G 1/40* (2006.01)
*B64G 1/24* (2006.01)
*B64G 1/44* (2006.01)

(56) References Cited

U.S. PATENT DOCUMENTS

| | | | |
|---|---|---|---|
| 5,133,518 A * | 7/1992 | Flament | 244/168 |
| 5,305,971 A | 4/1994 | Decanini | |
| 5,443,231 A * | 8/1995 | Anzel | 244/164 |
| 5,459,669 A * | 10/1995 | Adsit et al. | 701/13 |
| 5,618,012 A * | 4/1997 | Lehner et al. | 244/168 |
| 5,775,645 A * | 7/1998 | Yocum et al. | 244/168 |
| 5,794,891 A * | 8/1998 | Polle et al. | 244/164 |
| 5,816,540 A * | 10/1998 | Murphy et al. | 244/172.7 |
| 5,833,175 A * | 11/1998 | Caplin | 244/158.1 |
| 5,957,411 A * | 9/1999 | Liu et al. | 244/169 |
| 5,984,236 A | 11/1999 | Keitel et al. | |
| 6,017,001 A * | 1/2000 | Lambeaux et al. | 244/169 |
| 6,032,903 A * | 3/2000 | Fowell et al. | 244/165 |
| 6,102,336 A * | 8/2000 | Cande | 244/168 |
| 6,135,394 A * | 10/2000 | Kamel et al. | 244/158.8 |
| 6,194,790 B1 * | 2/2001 | Griffin et al. | 290/1 R |
| 6,378,810 B1 * | 4/2002 | Pham et al. | 244/158.5 |
| 6,481,671 B1 * | 11/2002 | Blair | 244/168 |
| 6,609,683 B2 * | 8/2003 | Bauer et al. | 244/172.6 |
| 6,702,234 B1 * | 3/2004 | Goodzeit | 244/164 |
| 6,945,500 B2 * | 9/2005 | Wingo | 244/159.4 |
| 7,059,571 B2 * | 6/2006 | Kellberg | 244/169 |
| 7,624,949 B2 * | 12/2009 | Leyre | 244/168 |
| 7,980,514 B2 * | 7/2011 | Wehner et al. | 244/168 |
| 8,352,101 B2 * | 1/2013 | Thomas et al. | 701/13 |
| 8,439,312 B2 * | 5/2013 | Ho et al. | 244/169 |
| 8,505,853 B2 * | 8/2013 | Lagadec et al. | 244/171 |
| 8,868,263 B2 * | 10/2014 | Munir et al. | 701/13 |
| 2006/0038080 A1 * | 2/2006 | Polle | 244/168 |
| 2006/0169844 A1 * | 8/2006 | Clerc et al. | 244/168 |
| 2013/0292518 A1 * | 11/2013 | Lagadec et al. | 244/168 |

FOREIGN PATENT DOCUMENTS

| | | |
|---|---|---|
| FR | 2530046 A1 | 1/1984 |
| WO | 9209479 A2 | 6/1992 |

OTHER PUBLICATIONS

Del Cura et al., "Conexpress Orbital Life Extension Vehicle (CX-OLEV) GNC", Proceedings of the 6th International ESA Conference on Guidance, Navigation and Control Systems, Oct. 17-20, 2005, Loutraki, Greece.

* cited by examiner

METHOD OF CONTROLLING THE ATTITUDE OF A SATELLITE AND AN ATTITUDE-CONTROLLED SATELLITE

RELATED APPLICATIONS

This application is a §371 application from PCT/EP2012/068454 filed Sep. 19, 2012, which claims priority from French Patent Application No. 11 02835 filed Sep. 19, 2011, each of which is herein incorporated by reference in its entirety.

TECHNICAL FIELD OF THE INVENTION

The present invention belongs to the field of the control of the attitude and orbit of satellites. More particularly, the present invention relates to a method of controlling the attitude of a satellite comprising an angular momentum storage device whose stored angular momentum has to be controlled, as well as a satellite comprising adapted means for the implementation of this attitude control method.

BACKGROUND OF THE INVENTION

For satellites placed at high altitude relative to the Earth (typically above 1000 km), one of the main sources of disturbing torques that might introduce an undesirable modification of the attitude of the satellite is the solar pressure. It is the case for example for satellites placed in geostationary orbit (GEO, altitude of about 36 000 km).

To control the attitude of such a satellite, it is known to use control members allowing to creating reaction torques along three independent axes, for example wheels, such as reaction wheels or flywheels. Such wheels have the advantage of being able to operate using the renewable electrical energy created by solar panels.

However, they must store the angular momentum created by the compensation of some external disturbing torques the mean of which is not zero over a long time period, and this may only be done by progressively increasing the rotation speed of said wheels. These wheels form an angular momentum storage device, and must therefore be de-saturated regularly to reduce their rotation speeds. Without these de-saturation operations, the maximum rotation speeds of the wheels would eventually be attained.

These de-saturation operations are generally performed by means of chemical-propellant thrusters, and consequently give rise to an increased consumption of chemical propellants, this being prejudicial insofar as said chemical propellants are stowed aboard the satellite in necessarily limited quantities.

For satellites comprising solar panels comprising photovoltaic cells, intended to provide the electrical energy necessary for the operation of the satellite payload, it is known to exploit the solar pressure by using said solar panels as a solar sail to de-saturate the wheels. Indeed, it is possible to create torques by skewing the solar panels with respect to the Sun, which torques can be created to modify the attitude of the satellite and/or to de-saturate the wheels.

However, the skewing of the solar panels does not make it possible to create significant torques about the axis of rotation of said solar panels, so that it is not possible to de-saturate the component of the angular momentum of the wheels along this axis of rotation. Moreover, such a skewing of the solar panels gives rise to a sensible decline in the quantity of electrical energy generated by these solar panels.

An exemplary device making it possible to control the attitude of a satellite by using the solar panels while limiting the need for skewing of said solar panels is known from French patent No. 2 530 046. In this example, the solar panels comprise lateral flaps, said flaps exhibiting an inclination of slightly less than 90° with respect to the solar panels. As indicated in said patent, such a device makes it possible to limit the need for skewing of the solar panels insofar as a skewing of a few degrees is sufficient to create suitable torques. However, nor does this device make it possible to create significant torques on the satellite about the axis of rotation of the solar panels, therefore to de-saturate the wheels along this axis.

In the state of the art, the angular momentum created by disturbing torques of non-zero mean along the axis of rotation of the solar panels is accumulated in wheels which are de-saturated by means of chemical-propellant thrusters.

OBJECT AND SUMMARY OF THE INVENTION

The present invention is aimed in particular at proposing a method of controlling the attitude of a satellite which makes it possible to de-saturate the angular momentum accumulated by an angular momentum storage device along three axes without requiring a chemical-propellant thruster, and which makes it possible to limit the equipment required to both control the attitude of the satellite and control the orbit of said satellite.

According to a first aspect, the invention relates to a method of controlling the attitude of a satellite in orbit around a celestial body, the attitude of the satellite being controlled by means of an angular momentum storage device and by means of controllable surfaces of the satellite that are adapted to create torques for de-saturating the storage device by utilizing solar pressure, said controllable surfaces being arranged on mobile solar panels that can move in rotation around a Y axis. The attitude of the satellite is also controlled by means of at least one electric thruster also used to control the orbit of the satellite, the orientation of the at least one electric thruster being commanded so as to activate said at least one electric thruster with a direction of thrust deliberately not aligned with a center of mass of the satellite so as to create torques for de-saturating the storage device along the Y axis, the controllable surfaces being commanded so as to create torques for de-saturating said storage device in a plane orthogonal to the Y axis.

Thus, the attitude control method relies on the use of at least one electric thruster, also used to control the orbit of the satellite, to de-saturate the storage device along the Y axis. The controllable surfaces are used to de-saturate the storage device in the plane orthogonal to the Y axis, that is to say to compensate inter alia all or part of the angular momentum possibly stored in said plane orthogonal to the Y axis under the effect of the torques created by the at least one electric thruster.

According to particular modes of implementation, the attitude control method can comprise one or more of the following characteristics, taken in isolation or in accordance with all the technically possible combinations.

In a particular mode of implementation, the method comprises:

a step of commanding the at least one electric thruster to create a torque having a component for de-saturating the storage device adapted to compensate all or part of the angular momentum stored along the Y axis under the effect of disturbing torques, a step of commanding the storage device to compensate the torque created by the at least one electric thruster, a step of commanding the controllable surfaces to create a torque for de-saturating the storage device adapted to compensate all or part of the angular momentum stored in the plane orthogonal to the Y axis under the effect of the torque created by the at least one electric thruster, a step of commanding the storage device to compensate the de-saturation torque created by the controllable surfaces.

In a particular mode of implementation, the de-saturation torques created in the course of the step of commanding the at least one electric thruster and in the course of the step of commanding the controllable surfaces are adapted to bound the excursions of the angular momentum stored over time in the storage device between predefined values.

In a particular mode of implementation:

the step of commanding the at least one electric thruster and the step of commanding the storage device to compensate the torque created by the at least one electric thruster are executed simultaneously, and/or the step of commanding the controllable surfaces and the step of commanding the storage device to compensate the de-saturation torque created by the controllable surfaces are executed simultaneously.

In a particular mode of implementation, the controllable surfaces comprise photosensitive surfaces of the solar panels, and the de-saturation torques created by the controllable surfaces are created by rotation of the solar panels about the Y axis.

In a particular mode of implementation, the controllable surfaces comprise surfaces of lateral flaps tied to the solar panels and inclined with respect to said solar panels, and the de-saturation torques created by said controllable surfaces are created by rotation of the solar panels about the Y axis.

In a particular mode of implementation, the controllable surfaces comprise surfaces with controllable optical properties, and the de-saturation torques created by said controllable surfaces are created by modification of the optical properties of said controllable surfaces.

In a particular mode of implementation, the at least one electric thruster is commanded so as to create de-saturation torques exclusively along the Y axis.

In a particular mode of implementation, each activation of the at least one electric thruster to create torques for de-saturating the storage device along the Y axis is simultaneous with an activation of the at least one electric thruster to perform a control of the orbit of said satellite.

In a particular mode of implementation, the de-saturation torques, created to allow a modification of the angular momentum stored by the storage device, are created exclusively by means of the controllable surfaces and by means of the at least one electric thruster.

In a particular mode of implementation, the satellite being stationed in geostationary orbit, the at least one electric thruster is implemented to perform a North-South control of the orbit of the satellite.

According to a second aspect, the invention relates to a satellite intended to be stationed in orbit around a celestial body, comprising means for controlling the attitude of said satellite and means for controlling the orbit of said satellite, said means for controlling the attitude comprising an angular momentum storage device and de-saturating means adapted to create torques for de-saturating said storage device. The means for de-saturating the storage device comprise:

controllable surfaces of the satellite that are adapted to create torques for de-saturating the storage device by utilizing solar pressure, said controllable surfaces being arranged on solar panels that can move in rotation about a Y axis, at least one electric thruster of the means for controlling the orbit of the satellite, a command module configured to control the orientation of the at least one electric thruster so as to activate said at least one electric thruster with a direction of thrust deliberately not aligned with a center of mass of the satellite so as to create torques for de-saturating the storage device along the Y axis, and configured to control said controllable surfaces to create torques for de-saturating said storage device in a plane orthogonal to the Y axis.

According to particular embodiments, the satellite can comprise one or more of the following characteristics, taken in isolation or in accordance with all the technically possible combinations.

In a particular embodiment, the controllable surfaces comprise photosensitive surfaces of the solar panels of the satellite.

In a particular embodiment, the controllable surfaces comprise surfaces of lateral flaps tied to the solar panels of the satellite and inclined with respect to said solar panels.

BRIEF DESCRIPTION OF THE DRAWINGS

In a particular embodiment, the controllable surfaces comprise surfaces with controllable optical properties.

The invention will be better understood on reading the following description, provided as a non-limiting example, and in reference to the figures which represent.

DETAILED DESCRIPTION OF THE EMBODIMENTS

The present invention relates to a method 50 of controlling the attitude of a satellite 10 along three axes.

The subsequent description deals in a non limiting manner with the case of an attitude control of a satellite stationed in geostationary orbit (GEO).

It is however noted that the invention is more generally applicable to any satellite in orbit wherein external disturbing torques acting on a satellite are mainly the torques created by the solar radiation pressure, and wherein regular orbit controls must be performed for station-keeping of the satellite.

Figure 1:
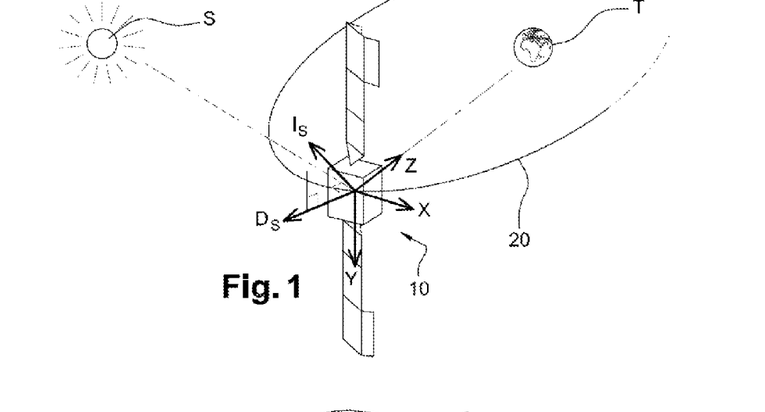
FIG. 1: a schematic representation of a satellite in geostationary orbit.

FIG. 1 very schematically represents a satellite 10 stationed in GEO orbit around the Earth T.

A local orbital frame (X, Y, Z) is defined. The center O of this frame is the position of the center O of mass of the satellite 10. The X axis is tangent at the center O to the geostationary orbit 20 of the satellite 10, and oriented along the speed vector of the satellite 10. The Z axis is directed toward the Earth T, and the Y axis is orthogonal to the XZ plane determined by the X and Z axes. Since the geostationary orbit 20 is substantially circular and centered on the Earth T, the X and Z axes are mutually orthogonal.

When the satellite 10 is in its nominal position and its nominal attitude once stationed in GEO orbit, the X, Y, Z axes coincide with axes tied to the satellite called the roll axis for the X axis, the pitch axis for the Y axis and the yaw axis for the Z axis. Hereinafter, only these roll, pitch and yaw axes tied to the satellite are considered, and they will continue to be named X, Y, Z respectively.

An axis $D_S$, which corresponds to the projection of the satellite/Sun S direction on the XZ plane, and an axis $I_S$, in the XZ plane and orthogonal to the axis $D_S$, are also defined.

Figure 2:
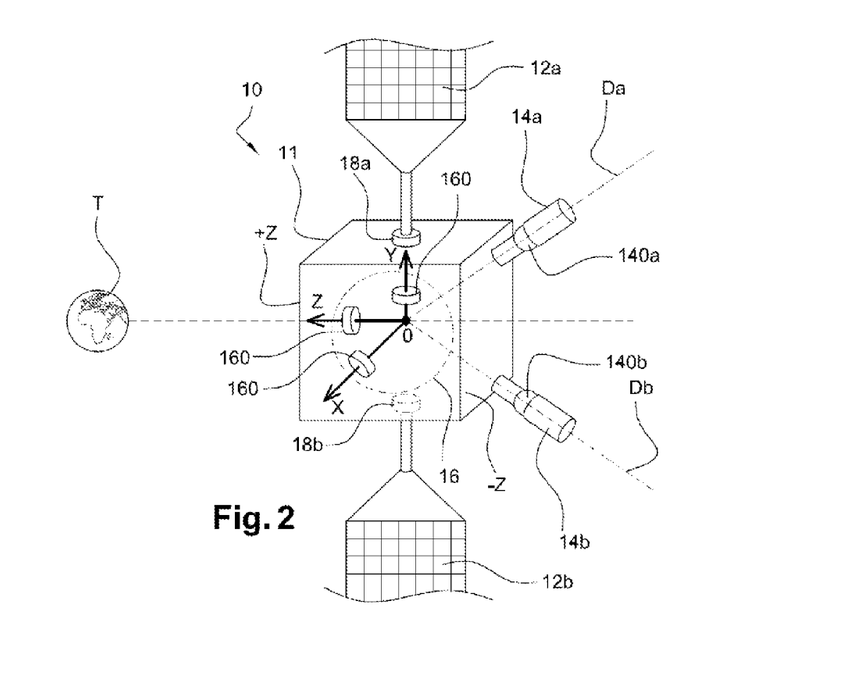
FIG. 2: a partial schematic representation of a preferred embodiment of a satellite according to the invention.

FIG. 2 schematically represents a preferred embodiment of a satellite 10 suitable for the implementation of the invention.

In the example of FIG. 2, the satellite 10 comprises a main body 11, of substantially parallelepipedal form, and two solar panels, respectively 12a and 12b, arranged in the service position on either side of said body 11.

The expression "in the service position" means the position that said solar panels 12a, 12b are intended to occupy in the satellite when it will be stationed in GEO orbit.

It is indeed understood that said solar panels can occupy other positions, so as in particular to reduce the bulk of the satellite at launch. In practice, the solar panels generally consist of several elements of the same rectangular shape folded back one above the other at launch. They are deployed once the satellite is stationed in GEO orbit or in a transfer orbit. In this case, the service position of said solar panels is the position that they occupy after deployment.

In the service position, the solar panels 12a, 12b are driven in rotation about an axis substantially aligned with the pitch axis Y by electric motors respectively 18a and 18b situated at the base of said solar panels. The axis of rotation of the solar panels is substantially in the plane of the panels, and generally corresponds to a longitudinal axis of symmetry of the solar panels. When the satellite is in its nominal attitude once stationed in GEO orbit, the axis of rotation of the panels is then substantially perpendicular to the plane of the GEO orbit.

In the service position, the solar panels 12a, 12b are in principle oriented so as to maximize the solar flux that they receive, whereas a face of the body 11 of the satellite, referred to as "+Z face", on which are disposed for example communication antennas (not represented in the figures) remains directed toward the Earth. In this case, the solar panels 12a, 12b rotate with respect to the body 11 of the satellite 10 by about one revolution a day.

Each solar panel 12a, 12b comprises a substantially plane face on which photovoltaic cells, referred to as "photosensitive surface", are arranged. The photosensitive surface of each solar panel 12a, 12b is oriented toward the Sun so as to generate the electricity necessary for the operation in particular of the payload of the satellite 10. In the usual case where the axis of rotation is maintained substantially orthogonal to the plane of the GEO orbit, the optimal orientation of the front faces of the solar panels is obtained, by rotation of the solar panels about the Y axis, when the axis $D_S$ is substantially orthogonal to said photosensitive surfaces.

The satellite 10 also comprises an attitude and orbit control system comprising:
  means for controlling the orbit of the satellite 10 (that is to say controlling the position of the satellite),
  means for controlling the attitude of the satellite 10 (that is to say controlling the orientation of the satellite),
  a module for commanding the means for controlling the attitude of the satellite 10 and the means for controlling the orbit of said satellite.

Means for Controlling the Orbit of the Satellite 10

The means for controlling the orbit of the satellite 10 are used mainly to perform a North-South control of the orbit, as well as an East-West control. "North-South control" means a control aimed at maintaining the satellite 10 in the envisaged plane of orbit. "East-West control" means a control of the position of the satellite 10 in the plane of orbit. It is indeed known that a satellite in space must be regularly brought back to the nominal position in its setpoint orbit. The expression "nominal position" means the position that it ought to occupy in its setpoint orbit at a given date. In the case of a GEO orbit, the attraction of the Moon and of the Sun causes an undesirable inclination of the orbit (requiring a North-South control of the orbit), while the anisotropy of the terrestrial sphere causes an Eastward or Westward drift of the apparent position in relation to the Earth (requiring an East-West control of the orbit).

In the case of a GEO orbit, the drifts related to the attraction of the Moon and Sun are more important than those related to the anisotropy of the terrestrial sphere, so that the North-South control is generally performed more frequently than the East-West control.

The means for controlling the orbit of the satellite 10 comprise, to perform the North-South control, at least one electric thruster 14a, 14b.

Preferably, and as illustrated by FIG. 2, the means for controlling the orbit comprise two electric thrusters 14a and 14b, to create thrust forces toward respectively the North (and to give the satellite 10 a southward reaction impulse) and the South (and to give the satellite 10 a northward reaction impulse) for a sufficient duration to return the satellite to the envisaged GEO orbit plane.

Nothing precludes, in other examples not detailed, from having a single electric thruster. Indeed, the northward and southward thrust forces are generally created near different instants corresponding to predefined positions of the satellite 10 in its GEO orbit. These predefined positions are substantially the nodes of the satellite orbit (intersection of the orbit with the plane of the equator), and the thrust forces are created continuously along a whole orbit segment around these nodes. It is possible in theory to perform the North-South control with a single electric thruster by mounting it on a mechanism suitable for orienting said electric thruster alternately toward the North and toward the South. However, such a mechanism, suitable for performing a North-South sweep, would be complex and would increase the risks of failures. Furthermore, there would be no redundancy in the case of a failure of the electric thruster.

In accordance with other examples, not detailed, nor does anything exclude having a number greater than two of electric thrusters 14a, 14b, in particular for purposes of redundancy and robustness of the attitude and orbit control system in the case of a failure of an electric thruster.

In the example represented in FIG. 2, the electric thrusters 14a and 14b are arranged on the side of a face of the satellite 10, referred to as "−Z face", opposite from the +Z face directed toward the Earth when the satellite is in its service position.

In FIG. 2 nominal directions Da and Db of the thrust forces of the electric thrusters 14a and 14b are represented.

The expression "nominal directions" means the directions of the thrust forces in order to perform the North-South control of the GEO orbit in an effective manner without creating a disturbing torque liable to modify the attitude of the satellite 10. So as not to create a disturbing torque, the nominal directions Da and Db pass through the center O of mass of the satellite 10.

Furthermore, the nominal directions Da and Db, are symmetric with respect to the XZ plane, and are not parallel to said XZ plane since said electric thrusters 14a, 14b must, to perform the North-South control of the orbit, create forces which have a non-zero component along the pitch axis Y. Because the nominal directions Da and Db pass through the center of mass of the satellite 10 so as not to create disturbing torques, the angle of skewing between the nominal directions Da, Db and the pitch axis Y can be significant, so as to make it possible to have a significant component along the pitch axis Y.

For example in FIG. 2, the nominal directions Da and Db are inclined with respect to the Y axis by angles of approximately 45° and approximately −45° respectively.

The electric thrusters 14a and 14b are mobile in orientation. For this purpose, they are carried by mechanisms 140a and 140b adapted to modify the orientation of the thrust forces of said electric thrusters. Such mechanisms 140a and 140b are necessary since the position of the center O of mass evolves over time, for example because the consumption of propellants modifies the distribution of the masses aboard the satellite 10. The nominal directions Da and Db therefore also evolve over time. The mechanisms 140a and 140b are implemented in current attitude and orbit control systems to ensure that the thrust forces are substantially aligned with the nominal directions Da, Db during the operations of North-South control of the orbit, so as to limit to the maximum the creation of torques by the electric thrusters.

The means for controlling the orbit of the satellite 10 can also comprise East-West control thrusters, which may be electrical or chemical. The construction of the means of East-West control of the orbit of the satellite 10 departs from the scope of the invention.

Means for Controlling the Attitude of the Satellite 10

The attitude control means of the satellite 10 attitude and orbit control system comprise:
an angular momentum storage device 16,
means for de-saturating the storage device 16.

The storage device 16 is of a type known to the person skilled in the art, and consists for example of a set of wheels 160, such as reaction wheels and/or flywheels. Such wheels 160 are driven by electric motors which make it possible to modify their rotation speed. The modification of the rotation speed of a wheel makes it possible to modify the angular momentum of this wheel, and thus to create a reaction torque on the satellite 10 about the axis of rotation of said wheel.

The variations of angular momenta of the wheels are controlled so as to oppose the external and internal disturbing torques acting on the satellite 10, in order to maintain the attitude of the satellite 10 near a setpoint attitude (with a typical precision of 0.01° to 0.1°).

In the non limiting example illustrated by FIG. 2, the storage device 16 comprises three wheels 160 arranged so as to allow the variation of angular momenta along three different axes.

The storage device 16 is the main device dedicated to the satellite attitude control, insofar as only this storage device 16 is used to permanently control the attitude of the satellite 10 in closed loop and along three axes.

On account of the cumulative character of some disturbing torques over time, known per se (such as for example some disturbing torques due to the solar pressure acting on the satellite), the rotation speed of the wheels 160 tends to increase to an upper limit value.

De-saturating means must then be implemented to de-saturate said wheels, that is to say to limit the excursion of their speed below a given limit value.

More precisely, the de-saturating means are used to create torques, referred to as "de-saturation torques", in the direction of the angular momenta of the wheels 160 to be de-saturated.

To maintain the satellite 10 in its setpoint attitude despite the creation of a de-saturation torque, the satellite 10 attitude and orbit control system will send commands to the wheels 160 so that they create a torque substantially opposite and equal in absolute value to the de-saturation torque applied by the de-saturating means, the effect of which will be to decrease the speed of these wheels and consequently to unload the angular momentum stored in said storage device 16.

This de-saturation scheme applies whatever de-saturating means are implemented to de-saturate the storage device 16.

In a preferred embodiment of the invention, the de-saturating means of the satellite 10 attitude and orbit control system comprise:
the solar panels 12a, 12b,
at least one of the electric thrusters 14a, 14b also used as means for controlling the orbit of the satellite 10.

The implementation of the solar panels 12a, 12b and of at least one electric thruster 14a, 14b to create torques for de-saturating the storage device 16 will be described in greater detail hereinafter.

Command Module

The satellite 10 attitude and orbit control system furthermore comprises a command module, not represented in the figures, adapted to command the storage device 16 (for example the speed of the wheels in the example considered), the drive motors 18a and 18b of the solar panels 12a and 12b, the orientation mechanisms 140a and 140b of the electric thrusters 14a and 14b of the orbit control system and the thrust forces of said electric thrusters.

Preferably, the command module is of the programmed computer type, comprising at least one microprocessor, and storage means (magnetic hard disk, flash memory, optical disk, etc.) in which a computer program product is stored, in the form of a set of program code instructions to be executed to perform the tasks relating to the attitude and orbit control of the satellite 10. According to some embodiments, the command module also comprises one or more programmable logic circuits, of FPGA, PLD type, etc.

In a manner known per se, to control the attitude and the orbit of the satellite 10, the command module processes a set of data provided by a set of sensors onboard the satellite and collected by known means, as well as a set of setpoints (that is to say of predefined values that must be taken by certain variables), these setpoints being calculated by the operators on the ground, sent to the satellite and stored aboard by likewise known means.

In a particular mode of implementation, the measurements originating from onboard sensors known per se, not detailed here, are for example the measurements of the following variables or of their variations: attitude of the body of the satellite 10 in an inertial frame, rotation speed of the body of the satellite in a frame tied to said body, rotation speed of the wheels, angles of orientation of the solar panels with respect to a reference, angles of orientation of the mechanisms of the electric thrusters with respect to a reference, state of the electric thrusters (on or off), etc. Other variables can be calculated by the attitude and orbit control system on the basis of these measurements, and one will then speak of estimated variables.

The setpoints may be for example the setpoint values over time of the attitude and of the speed of the body of the satellite 10 in the frame (X, Y, Z), of the orientation of the mechanisms for orienting the electric thrusters with respect to the body of the satellite 10, of the orientation of the solar panels with respect to this body, of the time intervals during which the thrust forces of the electric thrusters must be created, etc. These setpoints are sent by the operators of the satellite, or calculated aboard as a function of higher-level setpoints sent by the operators.

On the basis of the differences noted between all or some of the setpoint values and their measured or estimated values for the corresponding variables, the satellite 10 attitude and orbit control system will calculate the thrust forces and the torques to be applied to the satellite so as to decrease these differences, next it will calculate and transmit command orders to the members, known per se, in charge of modifying respectively the speed of the wheels, the orientation of the solar panels, the orientation of the mechanisms carrying the electric thrusters, the on or off state of said electric thrusters, said orders of control being orders of modifications of these variables such that the implementation of these modifications by these members will carry out the desired control forces and torques.

Satellite Attitude Control Method

In its principle, the attitude control method 50 according to the invention relates more particularly to the creation of torques for de-saturating the storage device 16, and is aimed at using mainly electric actuators to create said de-saturation torques.

To de-saturate the storage device 16 of the satellite 10 represented in FIG. 2, the following de-saturating means are preferably used:
 the solar panels 12a, 12b,
 at least one electric thruster 14a, 14b also used as means for controlling the attitude of the satellite 10.

It should be noted that the solar panels 12a, 12b represented in FIG. 2 are adapted to create torques, by utilizing the solar pressure, in the XZ plane.

The obtaining of torques in the XZ plane by using the solar panels 12a, 12b is performed in accordance with known procedures briefly summarized hereinafter. For the sake of simplification of the disclosure, consideration is given in a non limiting manner to the case where the longitudinal axis of the solar panels 12a, 12b and the axis of rotation of said solar panels are merged and aligned with the pitch axis Y. In this configuration, the solar panels 12a, 12b are oriented nominally toward the sun, that is to say the normal of the solar panels is aligned with the axis $D_S$.

By skewing, with respect to the axis $D_S$, the two solar panels 12a, 12b by one and the same angle but in opposite directions, a torque is created along the axis $D_S$, referred to as "windmill torque".

By skewing just one of the solar panels by a certain angle, the solar pressure will be slightly lower on this solar panel, and a torque, referred to as "unbalancing torque", along the axis $I_S$ will thus be created, in one or the other direction around this axis $I_S$ depending on whether the solar panel 12a or the solar panel 12b is skewed. If only the solar panel 12a is skewed by an angle α, a windmill torque is created along the axis $D_S$, simultaneously with the unbalancing torque. If it is desired to create a long-term effect equivalent solely to an unbalancing torque along the axis $I_S$, it is necessary to skew the solar panel 12a alternately and successively by an angle α and then by an opposite angle −α for the same duration, for example 5 minutes on one side and 5 minutes on the other. Thus, the windmill torque will be periodic with zero mean, and this will not produce any cumulative long-term effect on the increase in the angular momentum of the storage device 16. The short-term effect of the periodic windmill torque will be compensated by the storage device 16, without creating an increase in the long-term angular momentum in this direction.

By adding together the two skewing commands for the solar panels 12a, 12b, one of which creates a mean torque component along the axis $D_S$ and the other a mean torque component along the axis $I_S$, this will result in a mean torque in the XZ plane having said components according to said axes respectively.

It is noted that the solar panels 12a, 12b of FIG. 2 cannot create de-saturation torques along the Y axis.

However, it is known that disturbing torques have, along the Y axis, a non-zero mean over long periods (several orbital periods). The following sources of disturbing torques may be cited in particular:
 the solar pressure on the various surfaces of the satellite 10, including the solar panels 12a, 12b,
 the radiofrequency pressure created by transmitting antennas of the satellite 10, if any.

The storage device 16 will have to compensate these disturbing torques by continually increasing the component of its angular momentum along the Y axis, thus possibly going so far as to saturate if nothing is done.

Consequently, the at least one electric thruster 14a, 14b is used to create torques for de-saturating the storage device 16 along the pitch axis Y.

Thus, the attitude control method 50 uses the electric thrusters 14a, 14b to modify the component of the angular momentum of the storage device 16 along the pitch axis Y, so as to compensate the cumulative effect of the disturbing torques in this direction.

Preferably, the electric thrusters 14a, 14b are implemented to create de-saturation torques simultaneously with the operations of North-South control of the orbit.

More precisely, when one of the electric thrusters 14a, 14b is operated so as to carry out the North-South control of the orbit, the command module will command a pointing bias of this electric thruster with respect to its nominal direction (in which no torque is created by said electric thruster), this pointing bias being adapted so that the thrust force created by this electric thruster in the course of the North-South maneuver simultaneously creates a torque $C_E$, a de-saturation component $C_Y$ of which, along the pitch axis Y, is equal to a non-zero predefined setpoint.

During these operations, the command module simultaneously sends orders to the storage device 16 to compensate the effect of the de-saturation torque $C_Y$ created by the electric thrusters 14a, 14b so as to maintain the attitude of the satellite 10 close to the setpoint attitude.

For that purpose, the storage device 16 will create a torque substantially opposite to the de-saturation torque $C_Y$, the final effect of which will be to subtract a quantity equal to a value $H_Y$ from the angular momentum component of the storage device 16 along the pitch axis Y. The de-saturation torque $C_Y$ is therefore chosen so that its compensation will deduct a value $H_Y$ which actually makes it possible to de-saturate the storage device 16 along the Y axis.

However, the creation of the de-saturation torque $C_Y$ by the electric thrusters 14a, 14b is accompanied by the creation of residual torques $C_X$, $C_Z$ in the other directions X and Z respectively, because the direction of thrust of said thrusters is necessarily biased with respect to the Y axis (this point will be detailed further on). These residual torques $C_X$, $C_Z$ will be compensated by the storage device 16, the effect of which will generally be to increase the component of the angular momentum of the storage device 16 in the XZ plane.

The command module will then perform a reduction of the component of the angular momentum of the storage device 16 in the XZ plane by using the solar panels 12a, 12b, which themselves are adapted to create attitude control torques in this plane, this reduction being performed in accordance with the same principle as the de-saturation of the angular momentum along the Y axis.

Figure 3A:
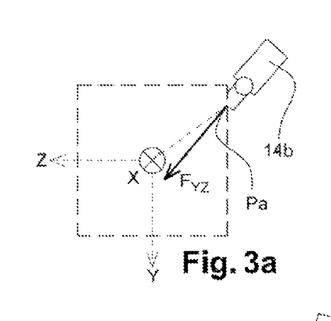
FIGS. 3a, 3b and 3c: schematic representations of an exemplary implementation of an electric thruster for creating torques on the satellite.
Figure 3B:
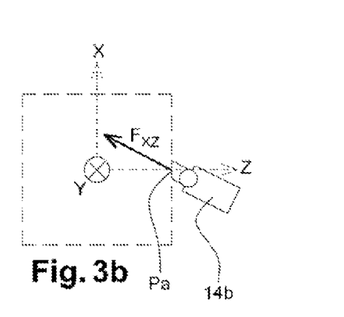
Figures 3C, 4:
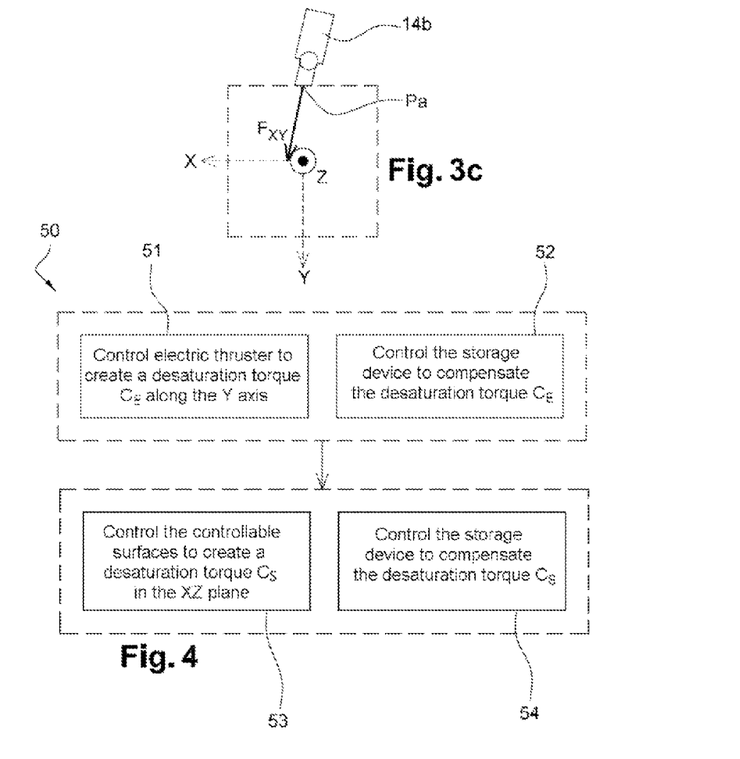
FIG. 4: a chart illustrating the main steps of an attitude control method according to a preferred mode of implementation of the invention.

FIGS. 3a, 3b and 3c illustrate the projections $F_{YZ}$, $F_{XZ}$, $F_{XY}$ of the thrust force $F_P$ exerted by the electric thruster 14b onto the planes YZ, XZ and XY respectively.

In FIG. 3a the projection $F_{YZ}$ of the thrust force of the electric thruster 14b in the plane YZ is represented. The orientation of the electric thruster is such that the component $F_{YZ}$ of the thrust force $F_P$ contains a component along the Y axis which allows the North-South control of the orbit of the satellite.

Ideally, the skewing of the electric thruster serving to create a de-saturation torque along the Y axis is calculated in such a way that simultaneously with this creation, no torque is created along the X axis. This is possible by ensuring that the straight line passing through the point of application Pa of the thrust force $F_P$ and whose direction is that of said thrust force intersects the straight line of direction X while passing through the center O of mass of the satellite 10.

However, in the example illustrated by FIG. 3a, the component $F_{YZ}$ is not directed perfectly toward the center O of mass of the satellite 10 as it ought ideally to be. This is due for example to some ignorance regarding the exact position of the center O of mass and the exact position of the point of application Pa of the thrust force $F_P$, and to pointing errors of the electric thruster 14b induced by the defects of the pointing mechanism 140b. Therefore, a non-zero torque $C_X$ is created around the X axis during this North-South maneuver.

In FIG. 3b, the component $F_{XZ}$ of the thrust force $F_P$ is not zero and this component is not directed toward the center O of mass of the satellite, giving rise to the creation of a torque $C_Y$ along the Y axis.

It should be noted that two effects are sought in the context of the invention: the first for North-South control of the orbit of the satellite 10, the second to modify the component along the Y axis of the angular momentum of the storage device 16. These effects are obtained by misaligning the thrust force $F_P$ of the electric thruster 14b with respect to the Y axis (FIG. 3a) and with respect to the Z axis (FIG. 3b) by virtue of the mechanism 140b.

As illustrated by FIG. 3c, the misalignment of the thrust force $F_P$ with respect to the Y and Z axes necessarily creates a component $F_{XY}$ in the plane XY which is not directed toward the center O of mass of the satellite 10, thereby creating a torque $C_Z$ along the Z axis.

It is hereby noted that the misalignment of the thrust force $F_P$ with respect to the Y and Z axes could be obtained with a component $F_{YZ}$ of the thrust force $F_P$ directed toward the center O of mass of the satellite 10. The torque $C_X$ is therefore due only to errors of implementation, whereas the torque $C_Z$ results from the implementation of desired effects.

The person skilled in the art understands on the basis of these figures that the components $F_{YZ}$, $F_{XZ}$ and $F_{XY}$ of the thrust force $F_P$ are deduced geometrically in a simple manner from the thrust force $F_P$. He also understands that the components of the torque $C_E$ engendered by this thrust force $F_P$ on the satellite 10 along the X, Y, Z axes can be calculated geometrically in a simple manner on the basis of the coordinates of the position of the point of application Pa of the thrust force $F_P$ on the satellite 10 and of the components $F_{YZ}$, $F_{XZ}$ and $F_{XY}$ of the thrust force.

The person skilled in the art therefore understands that several parameters can be adjusted to create a torque $C_E$ comprising a component $C_Y$ adapted to de-saturate the storage device 16 along the Y axis, for example one or more of the following parameters:

the position of the point of application Pa of the thrust force $F_P$ with respect to the center O of mass of the satellite 10, the nominal direction of the thrust force $F_P$, the angles of skewing of the electric thruster achieved by the mechanism for pointing said electric thruster, the thrust, that is to say the norm of the thrust force $F_P$, if the latter can be modulated in amplitude, the duration during which the electric thruster is activated.

Furthermore, the electric thruster preferably performs the attitude control operations and the orbit control operations simultaneously.

In this case, the above parameters are adjusted so as to ensure at one and the same time the North-South control of the orbit and the production of the desired de-saturation torque $C_Y$ along the Y axis. The adjusting of these parameters, once the objective has been fixed in accordance with the invention, is considered to be within the scope of the person skilled in the art.

FIG. 4 represents the main steps of the attitude control method 50 according to a preferred mode of implementation. As illustrated by FIG. 4, the method 50 comprises the following recurrent steps:

a step 51 of commanding an electric thruster 14a, 14b to create a torque $C_E$ having a de-saturation component $C_Y$ along the Y axis adapted to compensate all or part of the cumulative effect of disturbing torques along this axis, a step 52 of commanding the storage device 16 so as to compensate the torque $C_E$ created by the electric thruster 14a, 14b, a step 53, of commanding the solar panels 12a, 12b to create, by utilizing the solar pressure, a de-saturation torque $C_S$ adapted to compensate all or part of the torque ($C_E$–$C_Y$) created in the plane orthogonal to the Y axis by the electric thruster 14a, 14b during the control step 51, a step 54 of commanding the storage device 16 so as to compensate the de-saturation torque $C_S$ created by the solar panels 12a, 12b.

The step 51 of commanding an electric thruster 14a, 14b is aimed at allowing the de-saturation of the angular momentum accumulated by the storage device 16 along the Y axis under the cumulative effect of external disturbing torques along this axis.

The torque setpoint $C_Y$ is determined as a function of a de-saturation strategy which is for example precalculated and sent to the command module. This torque setpoint $C_Y$ is achieved as indicated previously by previously calculating setpoint angles of skewing of an electric thruster 14a, 14b and then by achieving these setpoint angles using the pointing mechanisms 140a, 140b.

The step 52 of commanding the storage device 16 is preferably executed simultaneously with the step 51 of commanding the electric thruster, so as to avoid a skewing of the satellite, and corresponds to performing the de-saturation of said storage device along the Y axis.

This control can be performed by the fine control of the attitude of the satellite carried out by the storage device 16, the effect of which will be to compensate the torque $C_E$ without particular setpoints other than stabilizing the satellite 10 around its setpoint attitude. As a variant, a torque setpoint of value $-C_E$ can be sent to the storage device 16, the sending of this setpoint being synchronized with the sending of the torque setpoint $C_E$ to the electric thruster.

The step 53 of commanding the solar panels can be performed by achieving pointing biases of said solar panels as explained previously. The de-saturation torque setpoint $C_S$ in the XZ plane is determined as a function of a strategy for de-saturating the angular momentum of the storage device 16 in the XZ plane. This commanding step 53 can be simultaneous or sequential with respect to the step 51 of commanding the electric thruster.

The step 54 of commanding the storage device 16 is preferably executed simultaneously with the step 53 of commanding the solar panels 12a, 12b, so as to avoid a skewing of the satellite, and is aimed at compensating the de-saturation torque $C_S$ created by the solar panels 12a, 12b.

It should be noted that if the electric thrusters 14a, 14b and the solar panels 12a, 12b are commanded simultaneously (steps 51 and 53) and such that the sum of the de-saturation torques $C_E$ and $C_S$ is substantially equal to the torque $C_Y$ created by the electric thrusters along the Y axis, steps 52 and 54 of control of the storage device 16 are also simultaneous and are aimed at compensating solely said torque $C_Y$.

In a particular mode of implementation, the attitude control method 50 comprises a step of prediction (not represented in the figures) of the residual torques $C_X$, $C_Z$ which will be created during a next execution of step 51 of electric thruster control. In this case, the execution of the step 53 of commanding the controllable surfaces is started before the execution of the next step 51 of electric thruster control so as to de-saturate the angular momentum of the storage device 16 in the XZ plane (control step 54) to a level such that it cannot saturate during the step 52 of commanding the storage device 16.

As indicated previously, each activation of an electric thruster 14a, 14b to create a de-saturation torque $C_Y$ on the satellite 10 is preferably simultaneous with an activation of this electric thruster 14a, 14b to perform a North-South control of the orbit of said satellite 10.

This avoids having to increase the frequency of activation of the electric thrusters 14a, 14b with respect to the case where they are only activated for the North-South orbit control. It also contributes to reducing the number of operations required to perform the attitude control and the orbit control, insofar as some operations are now both attitude control operations and orbit control operations. It is understood that this advantage is obtained by introducing a coupling between the attitude control and the orbit control.

Figure 5:
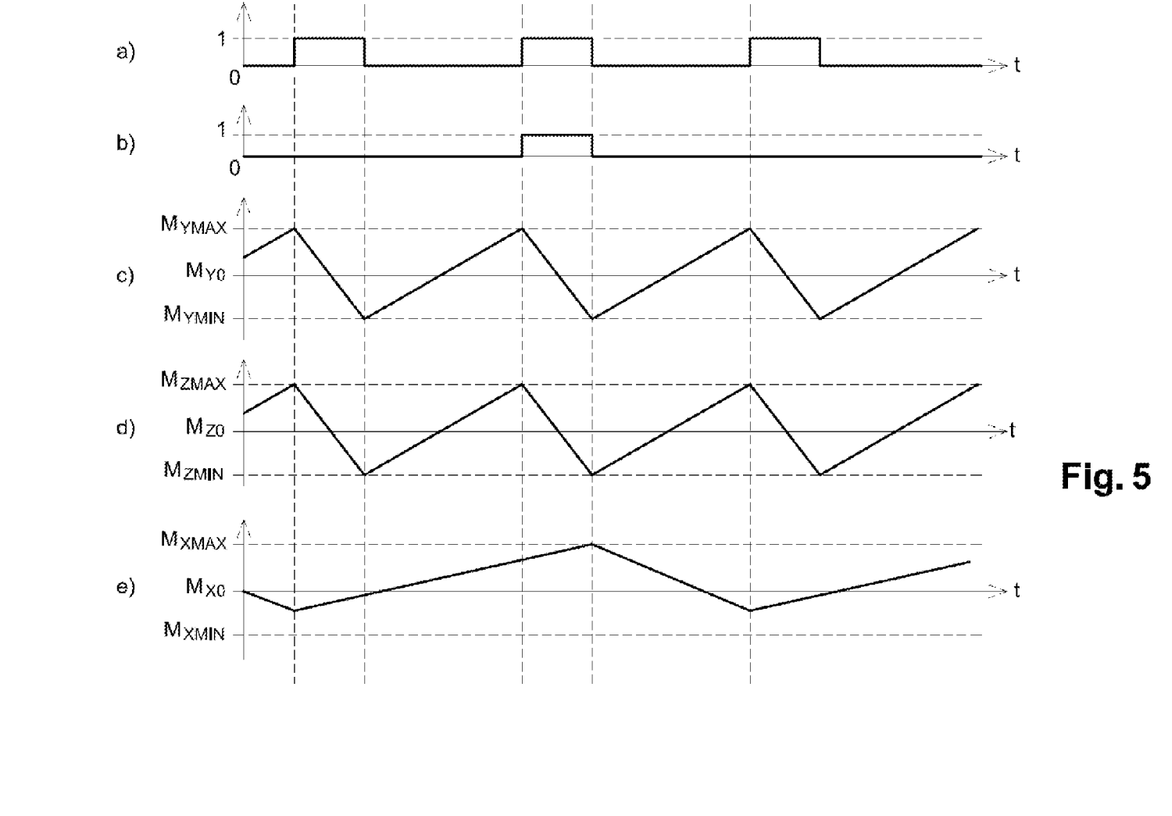
FIG. 5: curves schematically representing the effects produced by the attitude control method on the angular momentum stored in a storage device.

FIG. 5 schematically represents the effects that can be produced by the attitude control method 50 in an exemplary implementation. More particularly, FIG. 5 represents the evolution over time of various parameters resulting from steps 51, 52, 53 and 54 of the attitude control method 50.

Parts a) and b) of FIG. 5 represent the temporal evolution of the state of the electric thrusters respectively 14a and 14b over time, by means of a variable which takes the value 0 when the electric thruster is off (non-zero thrust force $F_P$), and the value 1 when the electric thruster is activated (non-zero thrust force $F_P$).

It is noted that in the course of an orbital period, the electric thrusters 14a and 14b will operate in alternation, the first near one of the nodes of the GEO orbit (points of intersection of the GEO orbit with the plane of the equator), the second near the other node.

In the example considered here, the case is dealt with where steps 51 of electric thruster control and 52 of control of the storage device 16 are executed simultaneously each time that at least one electric thruster 14a, 14b is used for the North-South control of the orbit.

Part c) of FIG. 5 represents the component $M_Y$ of the angular momentum of the storage device 16 along the pitch axis Y. This component $M_Y$ is centered on a non-zero mean value $M_{Y0}$ (assumed in a non-limiting manner as positive) since in many applications, it is not desirable for the speed of the wheels to become null (in particular because of the dynamic perturbations engendered by dry friction in the roller bearings).

It is observed that this component $M_Y$ has a tendency to increase over time toward a maximum value $M_{YMAX}$ not to be exceeded (saturation zone). This increase is the result of the cumulative effect of external disturbing torques acting continually on the satellite 10, this effect being continually compensated by the storage device 16 so as to avoid a skewing of the satellite 10. It should be noted that the direction of variation of the angular momentum has been chosen arbitrarily for illustrative purposes (it would have been possible to show a decrease in the angular momentum down to a minimum value $M_{YMIN}$ below which a saturation occurs). The direction of variation depends on the sign of the mean of the disturbing torque along the Y axis.

It is also observed that when an electric thruster is activated, when steps 51 of electric thruster control and 52 of control of the storage device 16 are executed, the component $M_Y$ of the angular momentum of the storage device 16 along the Y axis varies fairly rapidly to a value preferably substantially equal to the predefined minimum value $M_{YMIN}$. As indicated previously, this is achieved by commanding an appropriate skewing of the electric thruster so as to create a de-saturation torque $C_Y$ whose accumulated effect corresponds to a maximum excursion angular momentum variation ($M_{YMAX}-M_{YMIN}$). The skewing parameters of the electric thruster used are adjusted through a geometric calculation so as to make it possible for the component $M_Y$ at the end of the activation of the electric thruster to be substantially equal to the minimum value $M_{YMIN}$.

Part d) of FIG. 5 represents the evolution over time of the component $M_Z$ of the angular momentum of the storage device 16. In this example, during the execution of steps 51 of commanding the electric thruster and 52 of commanding said storage device, the component $M_Z$ varies fairly rapidly from a maximum value $M_{ZMAX}$ to a minimum value $M_{ZMIN}$ (in a non limiting manner the case is dealt with of a decreasing direction of variation of the component $M_Z$ during the de-saturation of the storage device 16 along the Y axis). This is due as indicated previously to the inevitable creation by the electric thrusters 14a, 14b of a residual torque $C_Z$ in step 51 of commanding the electric thrusters, which is compensated by the storage device 16.

Thereafter, the component $M_Z$ slowly increases to a value close to $M_{ZMAX}$, on account of the execution of step 53 of commanding the controllable surfaces, in the course of which the orientation of the solar panels 12a, 12b is commanded, and of the execution of step 54 of commanding the storage device 16. The maximum value $M_{ZMAX}$ is therefore a predefined setpoint value. Prediction of the residual torque $C_Z$ makes it possible to define this maximum value $M_{ZMAX}$ so that the component $M_Z$ varies around a mean value $M_{Z0}$ fixed in advance, between the values $M_{ZMIN}$ and $M_{ZMAX}$.

Finally, part e) of FIG. 5 represents the evolution of the component $M_X$ of the angular momentum of the storage device 16 along the X axis during all these operations.

In part e), the speed of variation of the component $M_X$ is considered in a non limiting manner as lower than for the other components $M_Y$, $M_Z$ of the angular momentum, since the skewing of the electric thrusters 14a 14b can be adjusted to minimize said component $M_X$.

In the example illustrated by part e) of FIG. 5, a systematic residual error in the knowledge of the position of the center O of mass of the satellite 10 nonetheless produces a cumulative effect, that can be corrected during step 53 of commanding the controllable surfaces, in the course of which the orientation of the solar panels is commanded, and during step 54 of commanding the storage device 16.

As illustrated by part e) of FIG. 5, the variation of the component $M_X$ around a mean value $M_{X0}$ between a minimum value $M_{XMIN}$ and a maximum value $M_{XMAX}$ is slower than for the components $M_Y$ and $M_Z$. Consequently, it is not necessary to de-saturate the component $M_X$ at each activation of an electric thruster 14a, 14b.

It should be noted that the choice of the mean values $M_{Y0}$, $M_{X0}$ and $M_{Z0}$ of the components $M_Y$, $M_X$ and $Mz$ departs from the scope of the invention, and depends on various constraints in operating the wheels 160 of the storage device 16.

Generally, any type of solar panels 12a, 12b adapted to create torques by solar sail can be implemented in the context of the invention.

Figure 6A:
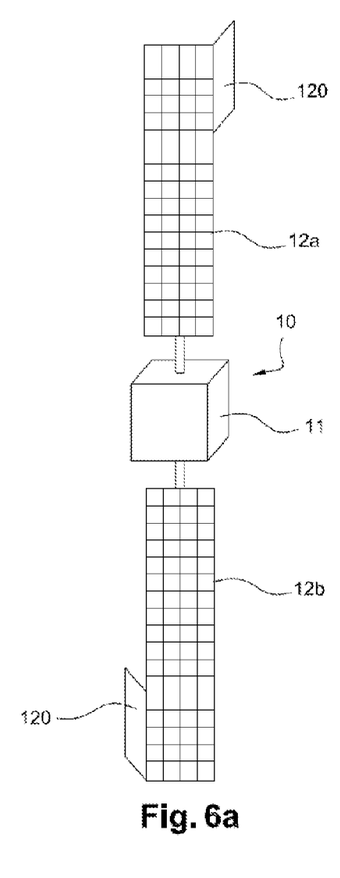
FIGS. 6a and 6b: schematic representations of variants of solar panels suitable for the implementation of a method of control according to the invention.

For example, the solar panels described in French patent No. 2 530 046 have already been cited, in which torques can be created mainly in the XZ plane by modifying the relative orientation of the solar panels, by rotation about an axis of rotation parallel to the pitch axis Y. Such solar panels are illustrated by FIG. 6a. Such solar panels comprise two lateral flaps 120, said flaps exhibiting an inclination of slightly less than 90° with respect to the solar panels. The controllable surfaces used to create de-saturation torques are in this case mainly the lateral flaps 120.

Just as for the example described previously, the solar panels described in French patent No. 2 530 046 are adapted to create torques in a mainly plane domain of action (the XZ plane), so that the electric thrusters 14a, 14b are advantageously implemented to create de-saturation torques outside of the domain of action of the solar panels, that is to say along the Y axis.

The use of solar panels comprising surfaces with controllable optical properties on the solar panels 12a, 12b may also be cited. The expression "optical properties" means more particularly the properties of transmission, absorption and reflection of light.

For example, the surfaces with controllable optical properties are achieved by means of electro-chromic materials, considered to be known to the person skilled in the art. Such electro-chromic materials have at least two optical states, and a transition from one optical state to another is performed by applying a suitable electrical excitation to them. Various types of electro-chromic materials are available, making it possible to obtain in particular the following transitions:
Type 1: transition from transparent to opaque absorbing,
Type 2: transition from transparent to opaque reflecting,
Type 3: transition from opaque absorbing to opaque reflecting.

An appropriate example of solar panels 12a, 12b comprising surfaces with controllable optical properties is described in U.S. Pat. No. 5,305,971. In this example, surfaces with controllable optical properties are arranged at the four corners of the solar panels furthest from a body of the satellite. By suitable command of the optical properties of each of the surfaces, torques can be created, at normal incidence of the solar rays on said solar panels, along the Y axis and the axis $I_S$. Torques can be created along the axis $D_S$ by opposite rotation of said solar panels around their axis of rotation.

It is therefore understood that the solar panels described in U.S. Pat. No. 5,305,971 can be used to create torques along three axes. The use of the electric thrusters 14a, 14b for the attitude control can in this case make it possible to reduce the capacity necessary for one or more wheels 160 of the storage device 16, which reduction in capacity will be accompanied by a reduction in the mass of the satellite 10.

According to another example, the solar panels described in U.S. Pat. No. 5,305,971 are advantageously implemented only to create torques along the Y and $I_S$ axes (assuming normal incidence of the solar rays on the solar panels), and the electric thrusters 14a, 14b are implemented to transfer disturbing torques along the axis $D_S$ in the plane formed by the Y and $I_S$ axes. In this way, the skewings of the solar panels 12a, 12b with respect to the Sun (to create torques with axis $D_S$) are no longer necessary, which skewings give rise to a sensible decline in the quantity of electrical energy generated.

Figure 6B:
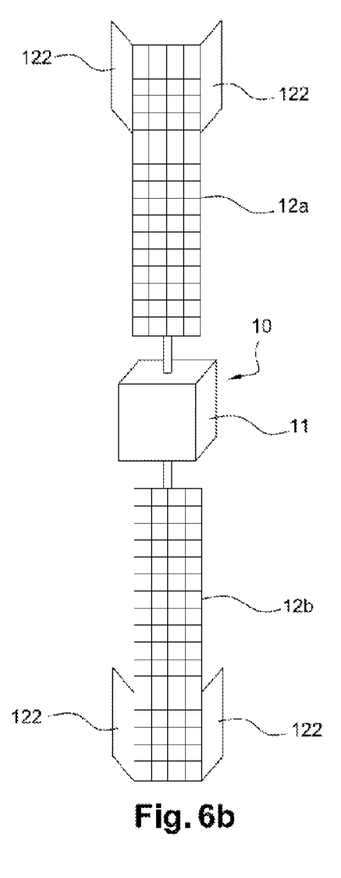

FIG. 6b represents another non limiting example of solar panels 12a, 12b comprising surfaces with controllable optical properties. In this case the solar panels 12a, 12b each comprise two lateral flaps 122 with controllable optical properties. Said flaps 122 are inclined with respect to the solar panels 12a, 12b, for example toward the rear, by a non-zero angle of preferably less than 45°, or indeed less than 20°.

Because the flaps 122 are inclined with respect to the solar panels 12a, 12b, a torque with axis $D_S$ (assuming normal incidence of the solar rays on the solar panels) can be created by commanding the optical properties of the flaps 122 separately, without having to skew the solar panels 12a, 12b with respect to the Sun. It is therefore understood that the solar panels illustrated by FIG. 6b can be implemented to create torques along three axes. The use of the electric thrusters 14a, 14b for the attitude control can in this case make it possible to reduce the capacity necessary for one or more wheels 160 of the storage device 16, which reduction in capacity will be accompanied by a reduction in the mass of the satellite 10.

It is therefore understood that, in the course of step 53 of commanding the solar panels 12a, 12b, the orientation of said solar panels and/or the optical properties of surfaces with controllable optical properties of said solar panels are/is commanded in particular.

The invention makes it possible consequently to have a satellite 10 comprising an attitude and orbit control system in which the means for de-saturating the storage device 16 can be constituted, under normal operation, exclusively by electrical means used aboard the satellite to carry out other functions:
the solar panels 12a, 12b (used to generate electrical energy),
the electric thrusters 14a, 14b (used for the North-South control and/or the East-West control of the orbit) whose orientation can be controlled by virtue of the mechanisms 140a, 140b.

The expression "under normal operation" means that nothing excludes the provision of other means, including chemical thrusters, that can be used in the case of failure of one or more electrical means implemented by default to de-saturate the storage device 16.

Advantageously, the electric thrusters 14a, 14b are used both as means for controlling the orbit of the satellite 10 and as means for controlling the attitude of said satellite 10. This dual use of the electric thrusters 14a, 14b introduces a coupling of the attitude control and orbit control operations which runs counter to the preconceptions of the person skilled in the art.

In a more general manner, it should be noted that the modes of implementation and of embodiment considered hereinabove have been described by way of non limiting examples, and that other variants may consequently be envisaged.

In particular, it is understood that the solar panels 12a, 12b can be replaced with other surfaces of the satellite 10 which can be implemented to create solar torques by utilizing the solar pressure. Such surfaces are controllable surfaces, that is to say whose orientation and/or optical properties can in particular be commanded.

Furthermore, the person skilled in the art understands that the method according to the invention is easily generalized to the case where the longitudinal axis of symmetry of at least one solar panel and the axis of rotation of the solar panel are misaligned typically by a few degrees to a few tens of degrees, and in the case where the axis of rotation of at least one solar panel is misaligned with respect to the pitch axis Y typically by a few degrees to a few tens of degrees, and also when the two biases coexist. The method can be implemented according to the same principle as that described hereinabove.

A variant embodiment consists in using an angular momentum storage device 16 comprising gyroscopic actuators making it possible at one and the same time to store an angular momentum and to create torques in relation to three degrees of freedom.

The invention claimed is:

1. A method of controlling an attitude of a satellite in orbit around a celestial body, comprising the steps of:
    controlling the attitude of the satellite by:
        an angular momentum storage device;
        controllable surfaces of the satellite configured to generate torques $C_s$ for de-saturating the storage device by utilizing solar pressure, the controllable surfaces being arranged on mobile solar panels that rotates around a Y axis; and
        at least one electric thruster that also controls the orbit of the satellite;
    controlling an orientation of said at least one electric thruster to activate said at least one electric thruster with a direction of thrust deliberately not aligned with a center of mass of the satellite to generate torques $C_y$ for de-saturating the storage device exclusively along the Y axis; and
    controlling the controllable surfaces to generate torques $C_s$ for de-saturating the storage device in a plane orthogonal to the Y axis.

2. The method as claimed in claim 1, comprising the steps of:
    commanding said at least one electric thruster to generate a torque $C_E$ having a component $C_Y$ for de-saturating the storage device to compensate all or part of the angular momentum stored along the Y axis under an effect of disturbing torques;
    commanding the storage device to compensate the torque $C_E$ generated by said at least one electric thruster;
    commanding the controllable surfaces to generate a torque $C_S$ for de-saturating the storage device to compensate all or part of the angular momentum stored in the plane orthogonal to the Y axis under an effect of the torque $C_E$ generated by said at least one electric thruster; and
    commanding the storage device to compensate the de-saturation torque $C_S$ generated by the controllable surfaces.

3. The method as claimed in claim 2, further comprising the step of bounding excursions of the angular momentum stored over time in the storage device between predefined values by the de-saturation torques $C_Y$ and $C_S$.

4. The method as claimed in claim 2, further comprising the step performing at least one of the following steps:
    simultaneously executing the step of commanding said at least one electric thruster and the step of commanding the storage device to compensate the torque $C_E$ generated by said at least one electric thruster; and
    simultaneously executing the steps of commanding the controllable surfaces and the step of commanding the storage device to compensate the de-saturation torque CS generated by the controllable surfaces.

5. The method as claimed in claim 1, wherein the controllable surfaces comprise photosensitive surfaces of the solar panels; and further comprising the step of rotating the solar panels around the Y axis to generate the de-saturation torques $C_S$.

6. The method as claimed in claim 1, wherein the controllable surfaces comprise surfaces of lateral flaps tied to the solar panels and inclined with respect to said solar panels; and further comprising the step of rotating the solar panels around the Y axis to generate the de-saturation torques $C_S$.

7. The method as claimed in claim 1, wherein the controllable surfaces comprise surfaces with controllable optical properties; and further comprising the step of modifying the optical properties of the controllable surfaces to generate the de-saturation torques $C_S$.

8. The method as claimed in claim 1, further comprising the step of utilizing the controllable surfaces to compensate the angular momentum stored in the plane orthogonal to the Y axis under the effect of the torques $C_E$ generated by said at least one electric thruster.

9. The method as claimed in claim 1, further comprising the step of activating said at least one electric thruster to control the orbit of said satellite simultaneously with each activation of said at least one electric thruster to generate torques $C_Y$ for de-saturating the storage device along the Y axis.

10. The method as claimed in claim 8, further comprising the step of generating the de-saturation torques $C_Y$, $C_S$ exclusively by the controllable surfaces and by said at least one electric thruster, the de-saturation torques $C_Y$, $C_S$ being generated to permit modification of the angular momentum stored by the storage device.

11. The method as claimed in claim 1, wherein the satellite is stationed in geostationary orbit; and further comprising the step of utilizing said at least one electric thruster to perform a North-South control of the orbit of the satellite.

12. A satellite for orbiting around a celestial body, comprising:
    a device for controlling an orbit of the satellite;
    a device for controlling an attitude of the satellite and comprising:
        an angular momentum storage device; and
        a de-saturating device for generating torques for de-saturating the storage device and comprising:
            controllable surfaces of the satellite configured to generate torques for de-saturating the storage device by utilizing solar pressure, the controllable surfaces being arranged on solar panels that rotates around a Y axis;
            at least one electric thruster of the device for controlling the orbit of the satellite; and
            a command module for controlling an orientation of said at least one electric thruster to activate said at least one electric thruster with a direction of thrust deliberately not aligned with a center of mass of the satellite to generate torques for de-saturating the storage device exclusively along the Y axis, and for controlling the controllable surfaces to generate torques for de-saturating the storage device in a plane orthogonal to the Y axis.

13. The satellite as claimed in claim 12, wherein the controllable surfaces comprise photosensitive surfaces of the solar panels of the satellite.

14. The satellite as claimed in claim 12, wherein the controllable surfaces comprise surfaces of lateral flaps tied to the solar panels of the satellite and inclined with respect to the solar panels.

15. The satellite as claimed in claim 12, wherein the controllable surfaces comprise surfaces with controllable optical properties.

16. The satellite as claimed in claim 12 wherein the desaturating device comprises exclusively of the controllable surfaces and said at least one electric thruster.

* * * * *